(12) United States Patent
Luo

(10) Patent No.: US 7,582,818 B2
(45) Date of Patent: Sep. 1, 2009

(54) VIOLIN THUMB PAD

(76) Inventor: Tong Luo, 2053 Rancho Higuera Ct., Fremont, CA (US) 94539

( * ) Notice: Subject to any disclaimer, the term of this patent is extended or adjusted under 35 U.S.C. 154(b) by 0 days.

(21) Appl. No.: 11/768,195

(22) Filed: Jun. 25, 2007

(65) Prior Publication Data

US 2008/0314225 A1 Dec. 25, 2008

(51) Int. Cl.
*G10D 1/02* (2006.01)
(52) U.S. Cl. .............................. 84/280; 2/21
(58) Field of Classification Search ............ 84/280; 2/21, 163; D17/20; D11/26; D29/113
See application file for complete search history.

(56) References Cited

U.S. PATENT DOCUMENTS 2,259,388 A * 10/1941 Mell .............................. 2/21
5,517,692 A * 5/1996 Wunderlich-Kehm ............ 2/21
6,393,616 B1 * 5/2002 Woodard ........................ 2/163

* cited by examiner

*Primary Examiner*—Jianchun Qin
(74) *Attorney, Agent, or Firm*—T D Foster; M. Reza Savari

(57) ABSTRACT

A violin thumb pad that facilitates the optimal positioning of violin relative to the player's thumb supporting the violin neck, for teaching purpose and for increased comfort and reduced physical stress, is introduced. Assuming the violin player uses left hand to play the violin finger board, and used right hand to hold the bow, the violin thumb pad forces the left thumb and palm to turn towards the player so the player's fingers are inline with the violin string naturally. The violin thumb pad also forces the left thumb and to be comfortably straight. And it forces the left elbow to stay close with the player's body. The violin thumb pad also makes it easier to place the violin neck between the thumb and index finger and not letting the violin neck drop to the bottom of the thumb. The violin thumb pad comprises an elongated pad that has one side conformable to the thumb and one side conformable to the violin neck, and at least one harnesses or loops that fastens the pad to the thumb.

12 Claims, 4 Drawing Sheets

VIOLIN THUMB PAD

FIELD OF THE INVENTION

The present invention relates generally to a pad for a violin player's thumb supporting the violin neck and more particularly to a thumb pad having one face contacting the violin neck and one face contact the player's thumb supporting the violin neck. Assuming the player is holding the violin neck using left hand, wearing the thumb pad, the left thumb, wrist and elbow is forced into correct gesture.

BACKGROUND OF THE INVENTION

It is known that violin education has to start from very early age in order to be able to play at professional level. The popular Suzuki training method starts as early as 2-3 years old. While young kids benefit from the early musical education, most teachers experience difficulties to teach the young kids proper gestures of the thumb, finger, wrist, elbow, neck, body and foot. Especially, the correct gesture of the violin neck supporting thumb is probably one of the most difficult thing to teach kids at early age, yet it is critical for developing sophisticated finger skills. It is probably because young kids have yet developed strong muscular power, and the position is somewhat un-natural. Many young players do not have the correct thumb gesture even after years of playing, hence have developed habitually wrong gesture which would be difficult to correct later. Repetitively correcting wrong positioning of thumb, or wrist, or elbow, during teaching and practicing leads to interruption of momentum, waste of time, frustration on both teacher and pupil, and even violence and permanent lost of interest for kids to learn violin.

It would therefore be desirable to have the violin thumb pad that can be put on the left thumb when playing violin and force the left thumb in correct position, which in turn will force the left palm to turn clockwise towards the violin neck, and also force the left elbow to tuck in and stay close with player's body. With the help of this violin thumb pad, young player can consistently have left thumb, wrist and elbow in correction position during play, and can develop sophisticated finger skill more quickly.

DESCRIPTION OF THE PRIOR ART

Currently no such device has been found on the market to help violin player at very early age do correct thumb positioning during play.

SUMMARY OF THE INVENTION

It is the primary object of the present invention to provide a violin thumb pad with harnesses to help a violin player develop correct forms of left thumb and palm and elbow.

It is another object of the present invention to provide a violin thumb pad that is easy to put on and comfortable to a performer.

In one embodiment, the violin thumb pad includes an elongated pad that has one side conformable to the left thumb, which is call the thumb side, and one relatively flat side that touches the violin neck which is called the violin side, and one side connecting the thumb side and the violin side which is called the connecting side, and two harness stripes with one end connected to the violin side, and another end which can be attached to the connecting side using button-hole method.

DETAILED DESCRIPTION

Preferred Embodiment

Figure 1:
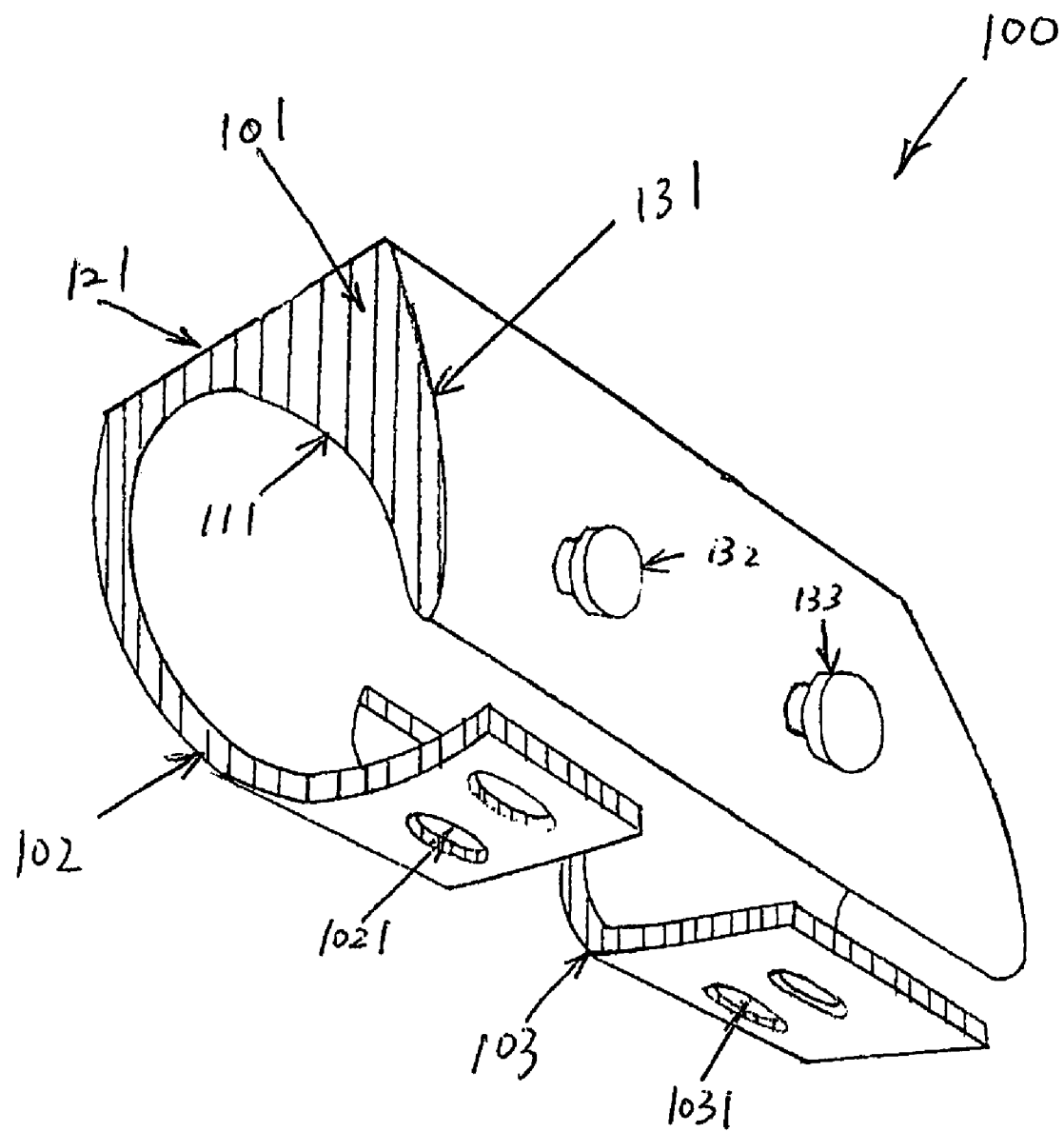
FIG. 1 is a perspective view of one embodiment of the present invention, showing the thumb side, the violin side, the connecting side with buttons, and two harness strips with holes.
Figure 2:
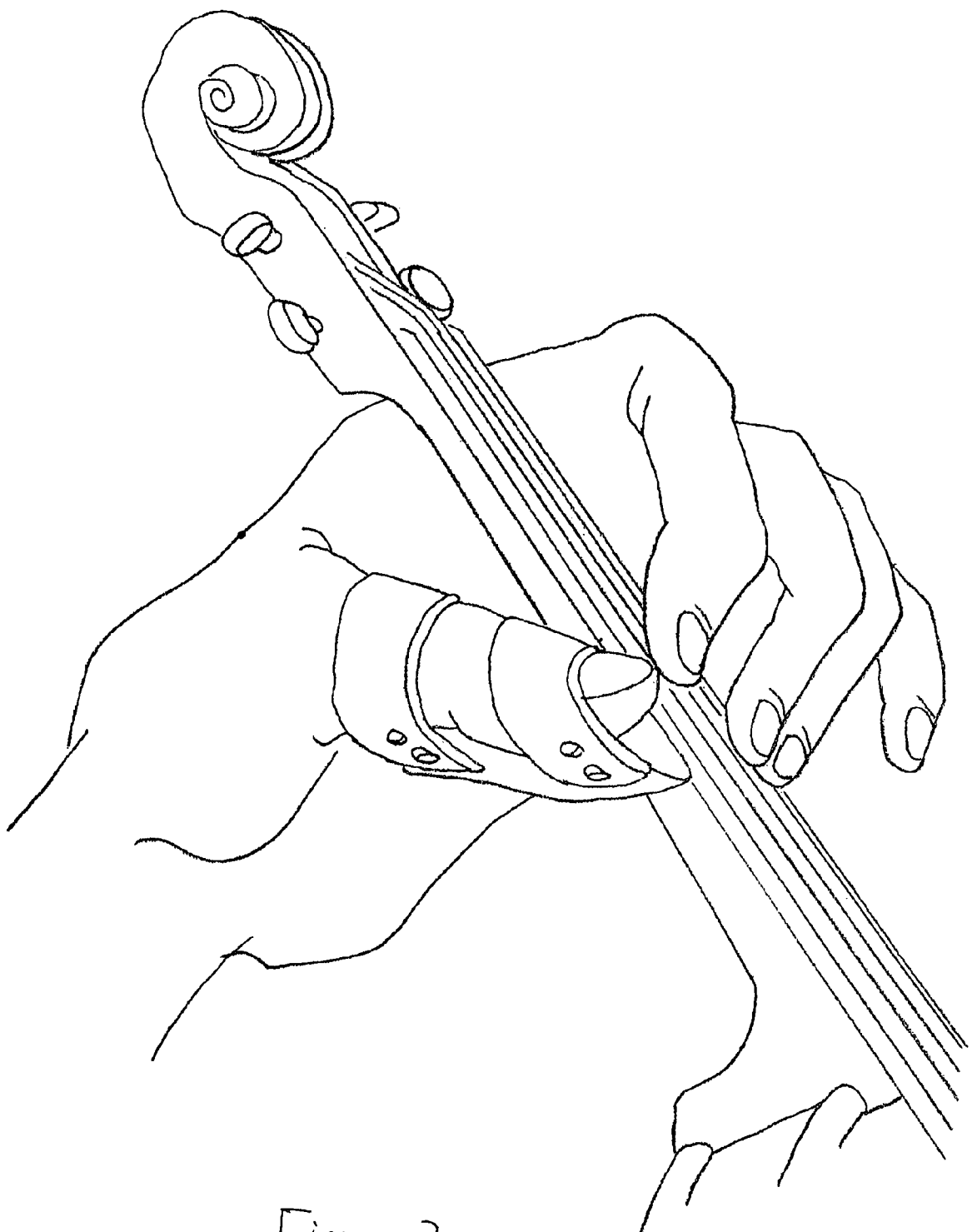
FIG. 2 is a usage view of the thumb pad, showing a violin player's left hand holding the violin neck with the violin thumb pad worn on the left thumb.
Figure 3:
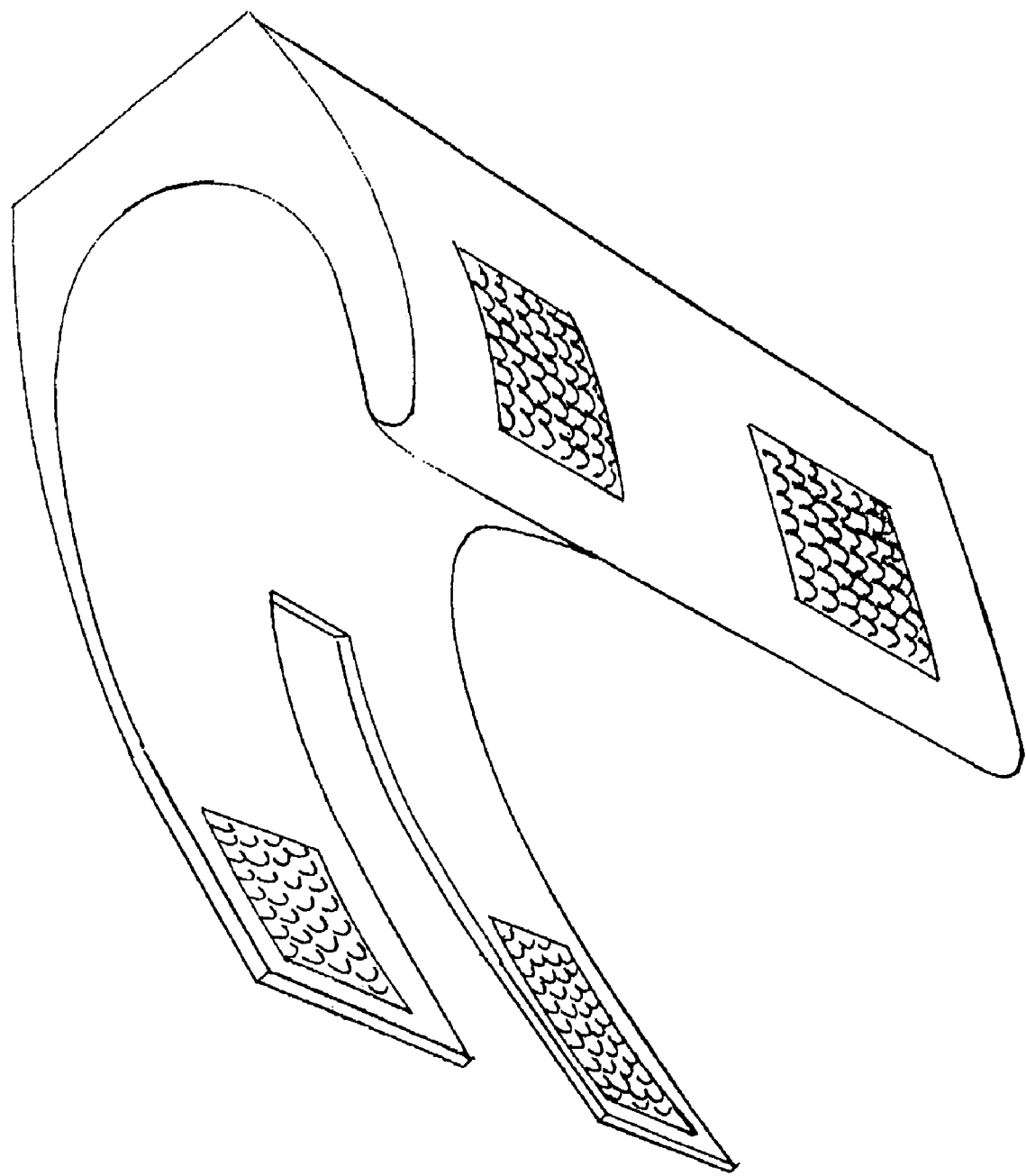
FIG. 3 is a perspective view of the second embodiment of the present invention using hook-and-loop as means of attachment.
Figure 4:
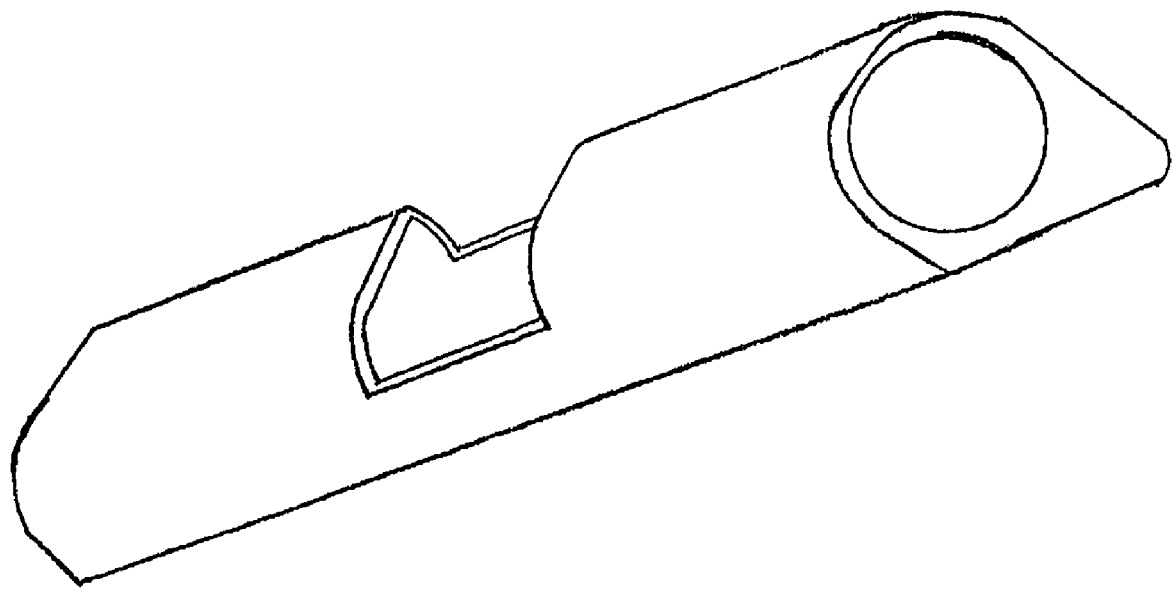
FIG. 4 is a perspective view of the third embodiment of the present invention where the elongated pad and connecting harness is made as one piece.

A preferred embodiment of present invention is illustrated in FIG. 1 (perspective view) and FIG. 2 (usage view). The violin thumb pad 100 of the present invention comprises an elongated pad 101, two harness stripes 102 and 103 attaching to the connecting side using button-and-hole method.

The elongated pad 101 has one side touching the thumb, namely thumb side 111, that contours and conforms to the thumb, and provide a player a soft and comfortable toughing feeling.

The elongated pad 101 has one side touching the violin neck, namely violin side 121, which is relatively flat and contacts the violin neck.

The elongated pad 101 has another side, namely connecting side 131, which attaches the harness strips 102 and 103 to the elongated pad 101.

The two harness stripes 102 and 103, has holes 1021 and 1032.

The connecting side 131 of the elongated pad 101 has buttons 132 and 133.

The elongated pad 101 is selected from the group of materials consisting essentially of rubber, flexible plastic, cloth, wood, and leather.

The harness strips 102 and 103 are selected from the group of materials consisting essentially of rubber, flexible plastic, cloth, and leather.

What is claimed is:

1. A thumb pad for use with a violin or similar stringed instrument, comprising:
    an elongated thumb pad facilitating the optimal positioning of a violin or similar stringed instrument relative to a player's thumb while playing, comprising a first side conformable to the thumb and joined to a substantially rigid and flat second side extending from the first side and forming an elongated wedge that tapers to a thin edge at the junction of the first side and the substantially rigid and flat second side touching the violin or similar stringed instrument neck and forcing the player's thumb and palm to turn toward the player, and a third side comprising a substantially U-shaped opening forming two connectors, the third side extending from the second side and connecting the first side to the second side around the thumb and attaching the thumb snuggly to the thumb pad.

2. The thumb pad of claim 1 wherein the third side of the elongated pad is selected from the group of materials consisting essentially of rubber, flexible plastic, wood, cloth, and leather.

3. The thumb pad of claim 1 wherein the elongated pad has means to attach to a fastening harness.

4. The thumb pad of claim 3 wherein the means of attaching is selected from a group of method consisting essentially of hook and loop, buckles, and button, or made as one piece of the elongated pad.

5. The thumb pad of claim 4 wherein the harness forms an "O" ring to let the thumb through and attaches to the thumb snuggly.

6. The thumb pad of claim 4 wherein the harness is selected from a group of materials consisting essentially of rubber, flexible plastic, cloth, and leather.

7. The thumb pad of claim 3 wherein the third side has means to attach the harness on the third side.

8. The thumb pad of claim 1 wherein the pad has one side contacting the thumb.

9. The thumb pad of claim 8 wherein the first side is shaped to conform the thumb.

10. The thumb pad of claim 1 wherein the pad has one side contacting the violin or similar stringed instrument.

11. The thumb pad of claim 10 wherein the second side is substantially flat or has a portion contouring the violin or similar stringed instrument neck.

12. A method of using a violin or similar stringed instrument, comprising the steps of:
 a) providing a thumb pad facilitating the optimal positioning of a stringed instrument relative to the player's thumb while playing, comprising a first side having a means to attach to a fastening harness and joined to a substantially rigid and flat second side extending from the first side and forming an elongated wedge that tapers to a thin edge at the junction of the first side and the substantially rigid and flat second side touching the neck of the stringed instrument and forcing the player's thumb and palm to turn toward the user, and the fastening harness comprising a substantially U-shaped opening forming two connectors, the fastening harness extending from the second side and connecting the first side to the second side around the thumb and attaching the thumb snuggly to the thumb pad,
 b) keeping the thumb comfortably straight,
 c) wrapping the harness around the thumb, and
 d) fastening the harness using the means of attaching so that the thumb pad is secured on the thumb.

\* \* \* \* \*